May 27, 1958  R. H. SHEPPARD  2,836,470
BEARING STRUCTURE CAP LOCATOR
Filed Dec. 8, 1953

INVENTOR
RICHARD H. SHEPPARD
BY Henry H. Snelling
ATTORNEY

United States Patent Office 2,836,470
Patented May 27, 1958

2,836,470
BEARING STRUCTURE CAP LOCATOR
Richard H. Sheppard, Hanover, Pa.
Application December 8, 1953, Serial No. 396,846
11 Claims. (Cl. 308—74)

This invention relates to connections between two co-operating members which require permanent alinement without regard to repeated separation and later reassembly, especially where the bolts normally holding the two members of the pair together are necessarily loose fitting in one or both members.

A further object of the invention is to provide a bearing structure for a pillow block or for a pedestal and cap or for a connecting rod wherein it is customary to fit the parts together prior to finishing the bore which is equally divided between the two members of the pair, and which will give all of the benefits of the usual dowel pins while avoiding the cost of such pins and more important the necessity for drilling the holes all the way through the cap and into the larger member and then reaming and peening. In the case of a connecting rod, for example, the hole goes completely through both the cap and the head or crank end of the rod.

A further object of the invention is to provide a connecting rod or similar bearing member in which two short holes are drilled (without reaming) preferably at right angles to each other, a ball is started in one hole which is a few thousandths of an inch smaller in diameter than the diameter of the ball and is shorter than such diameter, so that when the parts are clamped together just prior to finishing the bore of the bearing hole, the ball is forced to indent a bulge in the other hole, this action forming a deep spherical depression in one or the other of the two parts of the bearing, preferably in the smaller part or cap.

A prime object of the invention is to provide a means for locating a cap on the main portion of a connecting rod in such manner that the cost is greatly reduced altho highest modern precision is retained.

Figure 1:
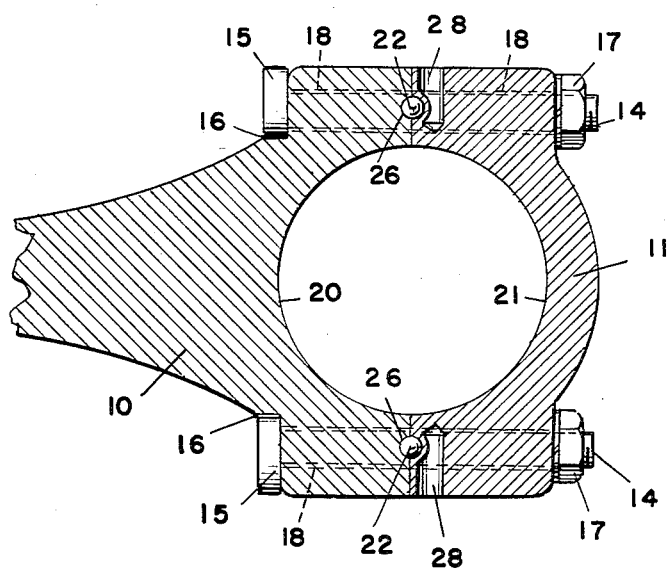
Figure 3:
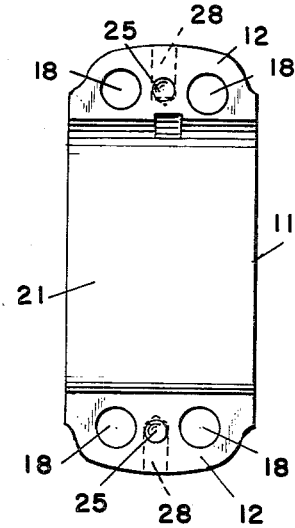
Figure 2:
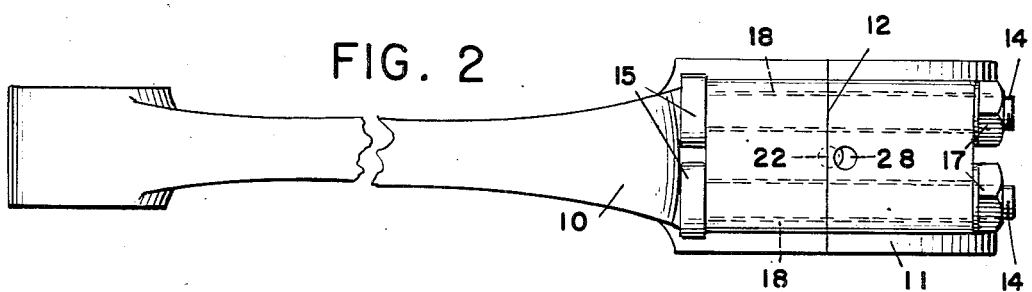
Figure 4:
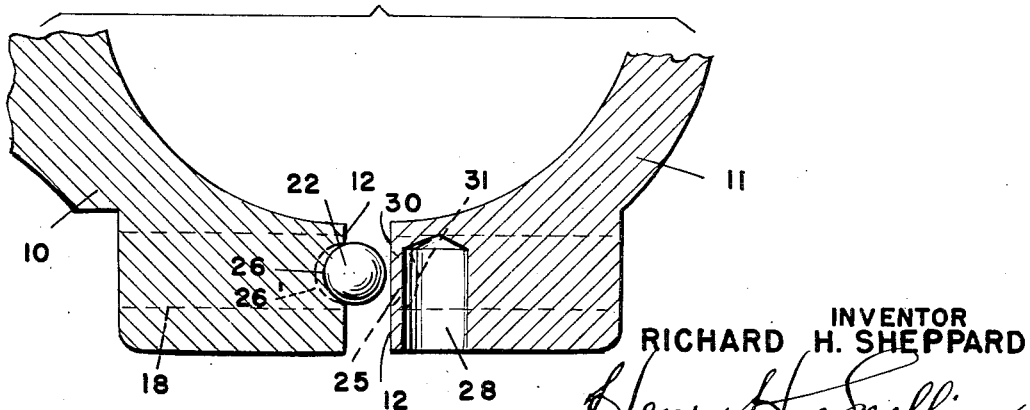

In the drawings:
Figure 1 is a central section through a connecting rod;
Figure 2 is a side view;
Figure 3 is a face view of the cap.
Figure 4 is a detail on a larger scale.

In the drawings, the numeral 10 represents the head end of a connecting rod or the pedestal portion of a pillow block or any other major portion of any type of bearing which is composed of two parts axially divided to form a bearing. The cap 11 in general follows normal construction, the two members of the bearing having co-operating plane surfaces 12 and the members of the pair are secured together by bolts 14, having heads 15, usually flattened on one side as at 16 and having one or more nuts 17. In some previous installations the bolt 14 has been precision ground but this construction is very expensive and yet it gives an accuracy not the slightest bit greater than the present relatively inexpensive device wherein each of the four bolts 14 are loose in the bores 18 in both the cap 11 and the shank head or base 10 of the bearing. The cylindrical faces 20 and 21 of the bearing follow any well known type including a sleeve, not shown, if desired.

The object of the invention, as stated previously, is to provide a means for locating the cap on the base with great accuracy irrespective of the number of times the cap is removed from the bearing. This is accomplished by imbedding a steel ball in one of the two members, preferably the larger, and forming a depression 25 in the other member, preferably the smaller. An extremely inexpensive and very accurate way for imbedding the ball and for forming the depression 25 is by drilling a short hole 26 (see Fig. 4) about perpendicular to the plane face 12 of the major member of the bearing and merely starting the ball 22 in this hole, the ball being a few thousandths of an inch greater in diameter than the diameter of the hole and being of a hardness in excess of the metal of the bearing. As a typical example, the steel ball may be $\frac{3}{16}$ of an inch in diameter and the hole is drilled with a No. 14 drill, requiring no reaming or any particular care because a slight error makes no difference at all, the sole purpose of the hole being to provide a starting hole in which to imbed the ball. A hole 28 is then bored at right angles to the hole 26, preferably altho not necessarily of the same size, and to extend a bit further down than the margin of the hole 26. The hole 28 normally would be bored at right angles to the upper surface of the cap on both sides of the cap but its location is not critical, this being important as much less care is required than in the former cases where dowel pins were used and the lead-out was often a problem. When the two holes are made as recited, the ball 22 is placed in the hole 26 and the shank and cap are clamped into place. It is possible to use the bolts for this purpose but it is preferred that the parts be put in a fixture and the setting be done with a press. The clamping action drives the ball 22 well into the hole 26 enlarging it as indicated by the dotted lines 26', the ball seating firmly in the bottom of the hole and projecting appreciably beyond the plane surface 12. When the ball has been firmly seated and the clamping continues, the ball indents the co-planar surface 30 of the cap making the indentation 25, shown here in dotted lines, and forming a bulge 31 inside of the hole, this bulge being best seen in Figure 2. It is my preference that the imbedded balls be midway between the bolts 14 on both sides of the bearing but, obviously, if a single bolt were used a ball 22 could be imbedded on both sides of the single bolts thus having four locating or positioning elements instead of two which is shown and is preferred as these balls in practice have given a precision fully equal to that of the ground bolts or the far more expensive dowel pins which have required reaming, long holes and peening of the hole after installation of the dowel in order to prevent loss of this pin which, incidentally, is quite expensive whereas the steel balls are readily obtainable in the highest quality at relatively low cost. As is obvious, the hole 28 provides a space into which the metal of the cap may cold flow during the clamping operation. While the location of this hole 28 is not at all critical it, obviously, should be in the path of movement of the ball during the clamping operation.

By use of the construction previously described an extremely accurate fitting of the cap and head of the rod may be had for the full life of the bearing and the bolts may be quite loose laterally in their bores as is required for best results. The area of weakness formed in the cap can be made in any way, the drilling operation being recited merely to show application of the invention to readily available parts. The hole 26 in the same manner could be formed originally in the pedestal or shank member of the bearing if so desired.

What I claim is:
1. A bearing assembly comprising two bearing mem- bers each having a pair of plane faces on opposite sides of a surface of revolution forming a portion of a bearing surface, releasable means for securing the two bearing members together with the bearing surfaces in registry, a pair of solid steel balls partially imbedded in one bearing member, one ball to project beyond each of said two faces, the other bearing member having a spherical depression in each of its two faces corresponding exactly to the projecting portion of a ball and lying in registry with the cooperating ball, each depression having a thin wall indented by the mating ball as the two bearing members are forced together so that each ball deforms the thin wall in forming the corresponding depression whereby when the two bearing members are separated they may readily be asesmbled with great precision as the spaced balls will guide the two bearing members into accurate position as the four plane faces are brought together by movement of the releasable securing means.

2. A bearing assembly having means for accurately reassembling separable members, said bearing being of the type in which the members are firmly but detachably secured together; comprising two bearing members each having two spaced surfaces with a portion of the bore between the spaced surfaces, one bearing member having a shallow hole normal to each of the two spaced surfaces, a solid steel ball of greater diameter than the hole forced into contact with the bottom of each hole and projecting beyond the surface by an amount not greater than the radius of the ball and the other bearing member having spherical depressions in its surfaces, each depression to receive with precision the projecting portion of a mating steel ball, and means to secure the bearing parts together.

3. An assembly comprising two members requiring precise alinement when reassembled and means for removably securing the two members together, one member having a surface and a plurality of positioning elements imbedded in the member and projecting beyond the surface, the other member having a contacting surface and an area of weakness near the contacting surface and in the projected path of each proximate projecting element, whereby as the two members are forced together in proper registry each element will indent the second member to force a portion into said area and thus to form a depression to position the members when being reassembled after separation, said areas of weakness each being adjacent a recess in the other member located proximate the contacting surface in the direction of movement of the indentations.

4. The assembly of claim 3 in which the elements are solid steel balls and the members are of a material of less hardness than the balls.

5. The assembly of claim 3 in which one of the members is the cap of a bearing, the two members have coplanar surfaces held in assembled relation by bolts loosely received laterally in at least one of the members, said bolts forming said securing means, and the positioning elements are solid steel balls offset with respect to a plane passing thru the contacting plane surfaces of the two members.

6. A connecting rod head having a plurality of steel balls imbedded in its plane contacting face, a cooperating cap having a plurality of holes slightly spaced from the cooperating plane face and in line of movement of the balls as the head and cap are forced into contact, said holes weakening the metal of the cap adjacent the place where the balls contact the cap on first assembly, and bolts for securing the cap to the head.

7. A connecting rod structure including a head having a pair of surfaces in a single plane at right angles to the longitudinal centerline of the connecting rod, a plurality of balls imbedded in the head and projecting beyond the plane surfaces, a cooperating cap having coplanar faces in each of which there is a spherical indentation to receive the projecting portion of the mating ball with accuracy, whereby the balls serve as locating elements to insure precision of reassembly when the parts of the connecting rod are separated, and bolts to secure the cap to the head.

8. The method of forming a positioning depression in the cap of a bearing to receive and guide a steel ball imbedded in the major part of the bearing which comprises drilling a hole at right angles to the plane face of the major part of the bearing of a diameter smaller than the diameter of the ball to a depth less than said diameter, drilling a weakening hole in the cap roughly parallel to the plane face of the cap with the hole in the cap nearer to the plane face of the cap than the diameter of the ball, placing the ball in the first hole, then clamping the cap and the major part together to cause the metal of the cap to flow into the weakening hole in the cap thus forming a locating depression in the cap for correctly positioning the members when reassembling after being separated.

9. The method of claim 8 in which the cap is held to the major part of the bearing assembly by parallel bolts on both sides of a plane at right angles to the engaging plane faces, the holes are located between each of the two pairs of bolts so there will be positioning projections and mating depressions at diametrically opposite sides of the bearing, and the weakening holes are roughly at right angles to the axis of the bearings.

10. A connecting rod structure including a head having a plane surface, a plurality of balls imbedded in the head and projecting beyond the plane surface, a cooperating cap having a coplanar base in which there are a plurality of spherical indentations each to receive the projecting portion of the mating ball with accuracy, there being a weakening space in the cap directly behind each spherical indentation leaving a wall in contact with the ball, and releasable means for securing the cap to the head, whereby the balls serve as locating elements to insure precision of re-assembly when the parts of the connecting rod are separated.

11. A bearing comprising a major member and a cap member, each member having a pair of plane faces, each face on opposite sides of a central cylindrical bearing surface, and a hole normal to each plane face of the major member, a plurality of pairs of bolts for releasably securing the members in registry, a pair of solid steel balls of greater diameter than the holes forced into firm contact with the bottom of each hole to project beyond the plane face, the cap member having a hole spaced from and parallel with each plane face and lying in the projected path of an imbedded ball as the map member is moved into contact with the major member, whereby when the two members are forced together the balls will indent the cap member and cause the displaced metal to move into the proximate holes in the cap member and thus form depressions to receive the balls with extreme accuracy.

References Cited in the file of this patent

UNITED STATES PATENTS

| Re. 17,265 | McKone | Apr. 9, 1929 |
| 696,603 | Smith | Apr. 1, 1902 |
| 703,447 | McGowan | July 1, 1902 |
| 1,612,047 | Owens | Dec. 28, 1926 |
| 2,305,156 | Grubel | Dec. 15, 1942 |
| 2,560,413 | Carlson | July 10, 1951 |
| 2,609,710 | Osborn | Sept. 9, 1952 |
| 2,624,907 | Graham | Jan. 13, 1953 |
| 2,767,034 | McCloskey | Oct. 16, 1956 |

FOREIGN PATENTS

| 536,097 | France | Feb. 6, 1922 |
| 876,197 | France | July 20, 1942 |